United States Patent
Pau et al.

(10) Patent No.: US 6,223,193 B1
(45) Date of Patent: Apr. 24, 2001

(54) MACROBLOCK VARIANCE ESTIMATOR FOR MPEG-2 VIDEO ENCODER

(75) Inventors: Danilo Pau, Sesto San Giovanni; Fabrizio Rovati, Cinisello Balsamo; Anna Valsasna, Saronno; Roberta Bruni, Seregno, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/190,550

(22) Filed: Nov. 12, 1998

(30) Foreign Application Priority Data

Nov. 12, 1997 (EP) .................................................. 97830591

(51) Int. Cl.[7] ............................ G06F 17/10; G06F 17/14; H04N 7/30
(52) U.S. Cl. ...................... 708/300; 708/400; 375/240.01
(58) Field of Search .................................... 708/300, 304, 708/400, 401, 402; 375/240.01, 240.02; 348/403.1, 404.1, 405.1, 406.1, 407.1

(56) References Cited

U.S. PATENT DOCUMENTS

| 5,486,863 | 1/1996 | Auyeung et al. . | |
|---|---|---|---|
| 5,598,484 | * 1/1997 | Suzuki et al. | 382/239 |
| 5,610,659 | 3/1997 | Maturi et al. . | |
| 5,737,020 | * 4/1998 | Hall et al. | 348/403 |
| 5,745,169 | * 4/1998 | Murphy et al. | 348/192 |
| 6,023,295 | * 2/2000 | Pau | 348/405 |

FOREIGN PATENT DOCUMENTS

| 0 661 887 A2 | 12/1994 | (EP) | H04N/7/50 |
|---|---|---|---|
| 0 778 709 A1 | 3/1996 | (EP) | H04N/7/50 |

* cited by examiner

*Primary Examiner*—Chuong Dinh Ngo
(74) *Attorney, Agent, or Firm*—Theodore E. Galanthay; Allen, Dyer Doppelt, Milbrath & Gilchrist, P.A.

(57) ABSTRACT

A hardware accelerator for a coding system for pictures includes an array of lines and columns of pixels, and calculates the variance of macroblocks of a digitized video image for a real-time coding of the current image together with the preceding and successive images, according to the MPEG-2 video algorithm. The architecture minimizes the silicon area needed for implementing the hardware accelerator for a cost-effective reduction on the CPU of the coding system. The use of a plurality of distinct filter/demultiplexers of known architectures is eliminated by conveying the incoming pixels to the respective input lines of distinct variance calculation paths by the use of a simple counter.

6 Claims, 12 Drawing Sheets

FIG. 5
PRIOR ART

| | |
|---|---|
| LINE 1 (8 pixels) | LINE 9 (8 pixels) |
| LINE 2 (8 pixels) | LINE 10 (8 pixels) |
| LINE 3 (8 pixels) | LINE 11 (8 pixels) |
| LINE 4 (8 pixels) | LINE 12 (8 pixels) |
| LINE 5 (8 pixels) | LINE 13 (8 pixels) |
| LINE 6 (8 pixels) | LINE 14 (8 pixels) |
| LINE 7 (8 pixels) | LINE 15 (8 pixels) |
| LINE 8 (8 pixels) | LINE 16 (8 pixels) |
| LINE 17 (8 pixels) | LINE 25 (8 pixels) |
| LINE 18 (8 pixels) | LINE 26 (8 pixels) |
| LINE 19 (8 pixels) | LINE 27 (8 pixels) |
| LINE 20 (8 pixels) | LINE 28 (8 pixels) |
| LINE 21 (8 pixels) | LINE 29 (8 pixels) |
| LINE 22 (8 pixels) | LINE 30 (8 pixels) |
| LINE 23 (8 pixels) | LINE 31 (8 pixels) |
| LINE 24 (8 pixels) | LINE 32 (8 pixels) |

MACROBLOCK b0: lines 1, 2, 3, 4, 5, 6, 7, 8
b1: lines 9, 10, 11, 12, 13, 14, 15, 16
b2: lines 17, 18, 19, 20, 21, 22, 23, 24
b3: lines 25, 26, 27, 28, 29, 30, 31, 32
b4: lines 1, 3, 5, 7, 17, 19, 21, 23
b5: lines 2, 4, 6, 8, 18, 20, 22, 24
b6: lines 9, 11, 13, 15, 25, 27, 29, 31
b7: lines 10, 12, 14, 16, 26, 28, 30, 32

$vX = (\sum(p(i)-\mu)^2)/64; \quad \mu = \sum p(i)/64$

Sums of all the pixels p(i) of the block bX $act = \max(v0, v1, v2, v3, v4, v5, v6, v7) + 1;$ Format of the pixel stream input to the circuit $$vX = (\Sigma(p(i)-\mu)^2)/64 = (((\Sigma p(i)^2) - (\Sigma p(i))^2/64))/64$$

MACROBLOCK VARIANCE ESTIMATOR FOR MPEG-2 VIDEO ENCODER

FIELD OF THE INVENTION

The present invention relates to digital circuits and, in particular, to a circuit for processing coded pixels of a video image.

BACKGROUND OF THE INVENTION

The video compression algorithm MPEG-2 requires the calculation of the variance of macroblocks of pixels of a digitized picture. FIG. 1 is a high level diagram of an MPEG-2 compression system, according to the prior art. A description of the MPEG-2 functional blocks (1–11) are provided below.

Block (1) Frame Ordering. This block includes one or more field memories outputting the fields (pictures) in the order required by the MPEG standard. For example, if the input sequence is I B B P B B P, etc., the ordered output sequence will be I P B B P B B, etc. I is a field and/or a semifield (Intra-picture) containing temporal redundancy. P is a field and/or a semifield (Predicted-picture). Referring to the preceding I or P (coded/decoded) picture, the temporal redundancy has been eliminated. B is a field and/or a semifield (Bidirectionally predicted-picture). Referring to the preceding I and successive P (or preceding P and successive P), the temporal redundancy has been eliminated. In either case, the I and P pictures must be considered already coded/decoded.

Each frame buffer in a 4:2:0 format occupies the following memory space:

| | | |
|---|---|---|
| standard PAL | 720 × 576 × 8 for luminance (Y) | = 3,317,760 bits |
| | 360 × 288 × 8 for chrominance (U) | = 829,440 bits |
| | 360 × 288 × 8 for chrominance (V) | = 829.440 bits |
| | Total Y + U + V | = 4,976,640 bits |
| standard NTSC | 720 × 480 × 8 for luminance (Y) | = 2,764,800 bits |
| | 360 × 240 × 8 for chrominance U | = 691,200 bits |
| | 360 × 240 × 8 for chrominance V | = 691.200 bits |
| | Total Y + U + V | = 4,147,200 bits |

Block (2) Motion Estimator. This block removes the temporal redundancy from P and B pictures.

Block (3) Discrete Cosine Transform (DCT). This block implements a discrete cosine transform according to the MPEG-2 standard. The I picture and the error pictures P and B are divided in macroblocks of 16 by 16 pixels. These pixels are in turn divided in four blocks of 8 by 8 pixels upon which the discrete cosine transform is performed.

Block (4) Quantizer (Q). An 8 by 8 block resulting from the DCT processing is divided by a quantizing matrix. This in general may change for the different macroblocks of a pictures reducing more or less the amplitude of the DCT coefficients. In such a case, the tendency is to lose the information associated to the highest frequencies less visible to human sight. The result is rearranged and sent to the successive block.

Block (5) Variable Length Coding (VLC). The coded words output by the quantizer tend to contain several null coefficients followed by non-null values. The null values preceding the first non-null value are counted and the result provides the first portion of a word, the second portion of which is the non-null coefficient. Some of these "pairs" tend to assume values more probable than others. The more probable values are coded with relatively short words (2–4 bits), while the less probable values are coded with longer words. Statistically, the number of output bits is reduced compared to the case in which such compressing methods are not implemented.

Block (6) Multiplexer and Buffer. The data generated by the variable length coder for each macroblock, the quantizing matrices, the motion vectors and other syntactic elements are assembled together to construct the final syntax according to the MPEG-2 standard. The stream produced is stored in a memory buffer whose limit dimension is set by the MPEG-2 standard and cannot be expanded. The quantizing block Q ensures that such a limit is followed. This is done by making more or less drastic the quantizing process of the 8 by 8 DCT blocks, depending on the degree of approach to the filling limit of the buffer.

Block (7) Inverse Variable Length Coder (I-VLC). The functions of the VLC block specified above are performed in a reverse order by this block.

Block (8) Inverse Quantizer (I-Q). The words output by the I-VLC block are reordered in 8 by 8 blocks, each being multiplied by the same quantizing matrix that was used for its coding.

Block (9) Inverse DCT (I-DCT). The DCT function is inverted and applied to each 8 by 8 block produced by the quantizing process.

Block (10) Motion Compensation and Frames Storing (Frames Store). At the output of the 8 by 8 I-DCT block the following may be obtained. The decoded I field (or semifield) that must be stored for removing the temporal redundancy from successive P and B pictures. The prediction error P and B field (or semifield) that must be added to the previously removed information during the motion estimation phase. For the case of a P picture, the resulting sum is used during the process of motion estimation of successive P pictures and B pictures. In both cases, the decoded I and/or P pictures are stored in field memories distinct from those (used for frame ordering) defined in the paragraph above.

Block (11) Display Unit. This unit converts the fields from the format 4:2:0 to the format 4:2:2, and generates the interlaced format for the subsequent display of the image.

The functional arrangement of the above-identified blocks according to the architecture implementing the coder is depicted in FIG. 2. The block (1) of frame ordering, the block (10) for storing the reconstructed P and I pictures, and the block (6) for storage of the bit stream produced by the MPEG-2 coding are commonly integrated into dedicated external memories. The integrated circuit accesses these dedicated external memories through a unique interface suitably controlled by an integrated memory controller.

The video core block comprises the pre-processing unit which converts the received pictures from the format 4:2:2 to the format 4:2:0 by filtering and subsampling the chrominance. The post-processing block implements the inverse function during the phase of decoding and displaying. The coding blocks (3, 4, 5) and the decoding blocks (7, 8, 9) are integrated within the Encoding & Decoding Core.

The system controller coordinates the processing that is performed within the device. The system controller also calculates the quantization matrix to be used in the block (4) as a function of the state of filling of the buffer described above for block (6), and of the variance of the source picture macroblock, upstream of the motion estimation processing. Such a system controller may be implemented, as depicted in FIG. 3, by a processor that executes via software its supervising functions. Such a block may integrate a 32 bit core CPU of the Reduced Instruction Set Computer (RISC) type. Plus, the block may integrate the subsystems needed for communicating with the external memory and control buses. A block containing the code to be performed may also be integrated.

In general, the coding algorithm for a frame size of M rows by N columns decomposed in macroblocks of R rows and S columns requires that M/R and N/S be even integers different from each other. Also, the calculation of a T (positive integer number) variance per macroblock, each calculated by starting from a block of size H (a submultiple of R) by K (a submultiple of S), is extracted from the macroblock according to a preestablished scheme with the possibility that each pixel belongs to more than one block, and the condition: T=2* (R/H)*(S/K).

Overall, for each frame it is necessary to perform (M*N)/(R*S)*T variance calculations, each over H*K pixels. For example, for the MPEG-2 algorithm R=S=16, H=K=T=8, M=576, and N=720 (for PAL format pictures). Therefore, 12,960 distinct variances are required, each based on 64 pixels. Such processing is so burdensome that it would require almost the full power of the CPU. In contrast, if such processing is assigned to a hardware accelerator (the VEE block of FIG. 3), a significant saving in terms of the power of calculation requested from the CPU is possible at the expense of a limited silicon area requirement, for implementing a specifically optimized accelerator.

The Variance Concept. The variances to be calculated are derived according to the ensuing description. As described above, the luminance component of a digital picture represented as a matrix of M rows and N columns of pixels, divided in R by S macroblocks which in turn are divided in T subsets or blocks, each of H by K size, is assumed to be known. Each pixel may be coded with 8 bits. For each subset, the variance is defined as follows:

$$\sigma^2 = \frac{1}{H*K}\left[\sum_{i=1}^{H}\sum_{j=1}^{K}(p(i,j)-\mu)^2\right]$$

with $$\mu = \frac{1}{H*K}\left[\sum_{i=1}^{H}\sum_{j=1}^{K}(p(i,j))\right]$$

For PAL format images, M and N are 576 and 720, respectively, and R=S=16, H=K=T=8 according to the standard MPEG-2. Each frame is thereafter divided in macroblocks of 16 by 16 pixels, starting from the upper left corner, as depicted in FIG. 4. The macroblocks are further subdivided in four adjacent 8 by 8 blocks. For each macroblock, eight variances must be calculated. Each variance consisting of the variance of an 8 by 8 subset (block) is derived from the macroblocks according to the manner that will be described later. The above mathematical formula for calculating the variance reduces itself to the following simplified expression that is applied to each subset. The input order of the pixels being from left to right and from the upper row or line to the line below it, though irrelevant in the calculation. Variances are calculated as follows:

$$\sigma^2 = \frac{1}{W}\sum_{i=1}^{W}(p(i)-\mu)^2,$$

where $$\mu = \frac{1}{W}\sum_{i=1}^{W}p(i),$$

with $$W = 64$$

Referring to FIG. 5, the eight subsets (b0, b1, b2, b3, b4, b5, b6, b7) are obtained in the following manner: the first four subsets are the four blocks forming the macroblock; the other four subsets are obtained by separating the even numbered lines or rows of each macroblock from the odd numbered ones. These are the odd field and even field components of each macroblock. Once the variances of the blocks have been calculated, the so-called activity of the macroblock, defined as max(v0, v1, v2, v3, v4, v5, v6, v7)+1, is calculated, wherein v0, . . . , v7 are the eight calculated variances. The activity of each macroblock contributes to the calculation of the quantizing matrix used in the quantizer Q of FIG. 1.

Standard Implementation of the Variance Estimator. The known implementation of the variance estimator, depicted in FIG. 6, includes eight distinct calculation blocks. Each block has the function of calculating, in parallel to the other, a single variance. Each of the eight parallel branches includes a filter/demultiplexer for catching only the pixels belonging to the relative block the variance of which must be calculated, in addition to the variance calculating circuit itself. This architecture has the drawback of replicating, for each variance to be calculated, parts that are functionally identical to each other. For example, the variance calculator always implements the same computation formula. Also, the filter/demultiplexers all perform the same functions, though with different parameters (each catching a selected subset of pixels).

SUMMARY OF THE INVENTION

An object of the present invention is to provide an optimized hardware accelerator capable of calculating the variance of macroblocks of a digitized video image for real-time coding of the current image together with the preceding and successive images, according to the video algorithm MPEG-2. Such an accelerator must subtract from the operations performed by the CPU which supervises the coding. The above-noted calculation work thus permits the use of less powerful CPUs than the ones that would be necessary in the absence of the optimized hardware accelerator. The proposed architecture minimizes the silicon area needed for implementing the hardware accelerator as compared to prior art implementations thereof, thus reducing costs.

The algorithm implemented in the variance estimator of the present invention exploits properties of the input data and of the mathematical formula of the variance to optimize silicon area requirements necessary for its implementation. In particular, the conveying of the pixels to the respective input lines of eight distinct variance calculation paths is implemented in a way as to be able to recognize by the use of a simple counter, to which variance the particular line of pixels belongs using two demultiplexers. This permits elimination of the use of eight distinct filter/demultiplexers of prior art architectures.

BRIEF DESCRIPTION OF THE DRAWINGS

The different aspects and advantages of the invention will become more evident through the following detailed description of an embodiment and by referring to the annexed drawings, wherein:

FIG. 5 shows the formation of eight subsets of data for each macroblock for the MPEG standard, according to the prior art;

DETAILED DESCRIPTION OF THE PREFERRED EMBODIMENTS

Figure 1:
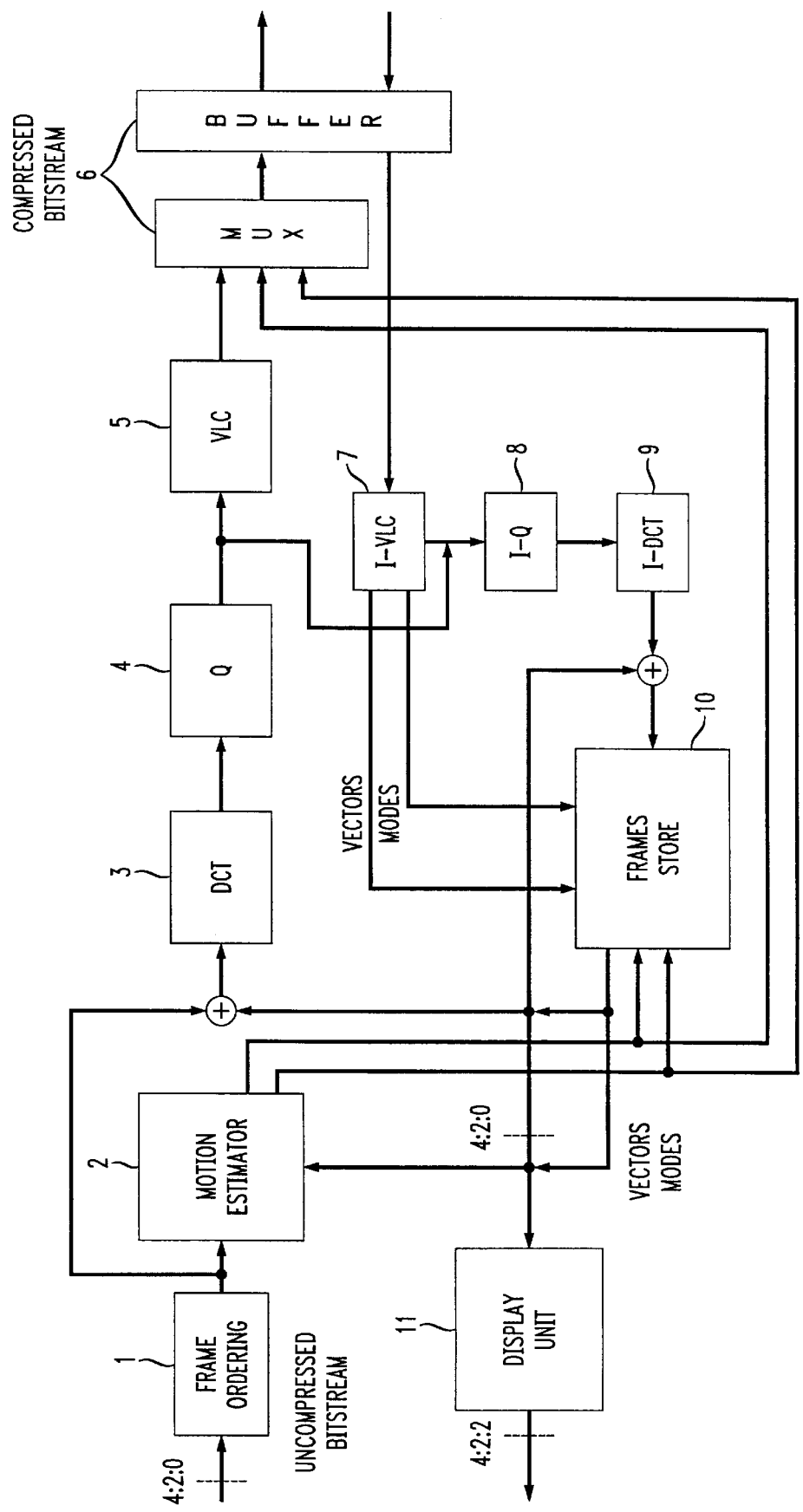
FIG. 1 is a high level diagram of an MPEG-2 compression stem, according to the prior art.
Figure 2:
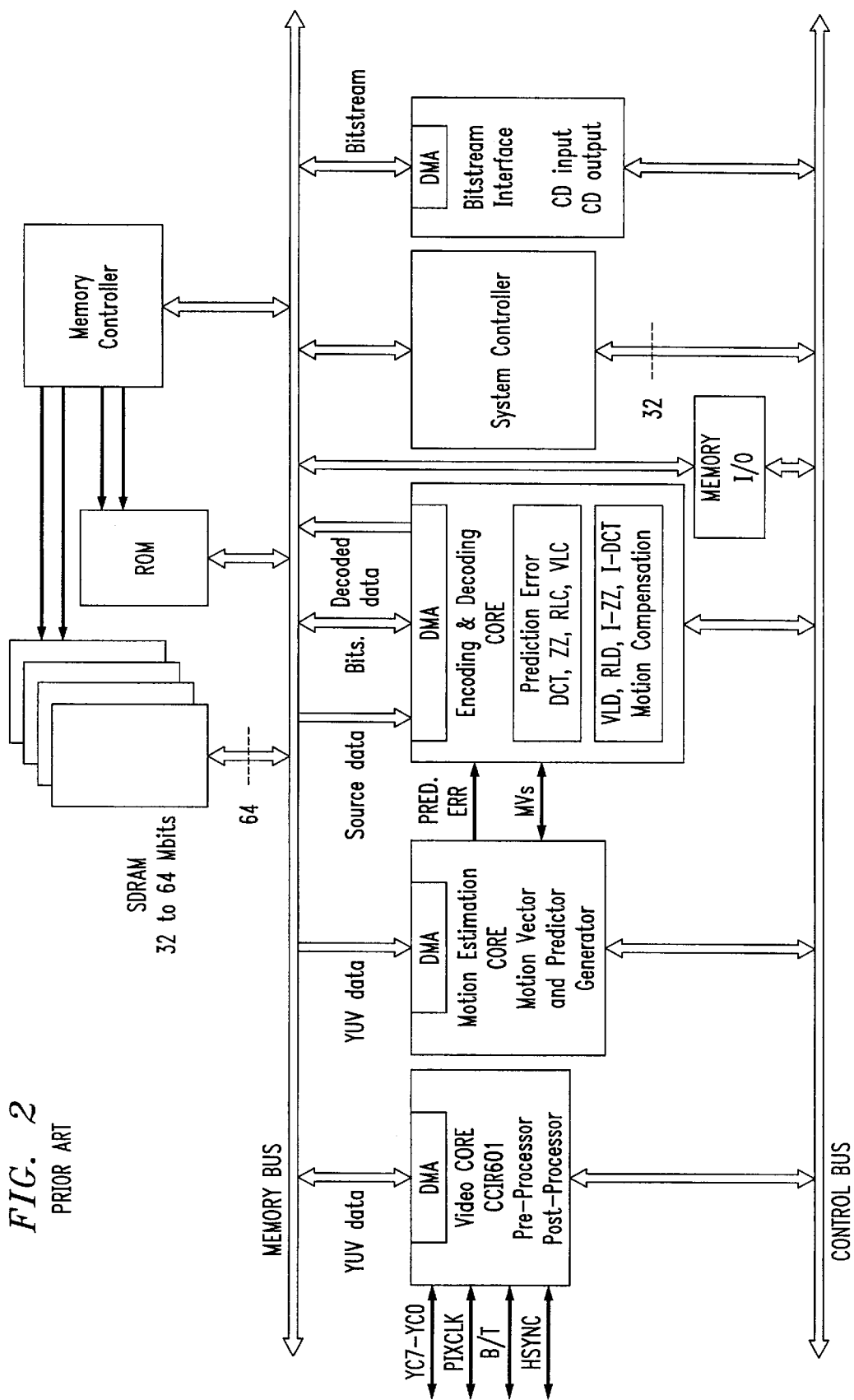
FIG. 2 is a high level diagram of an MPEG-2 coder, according to the prior art.
Figure 3:
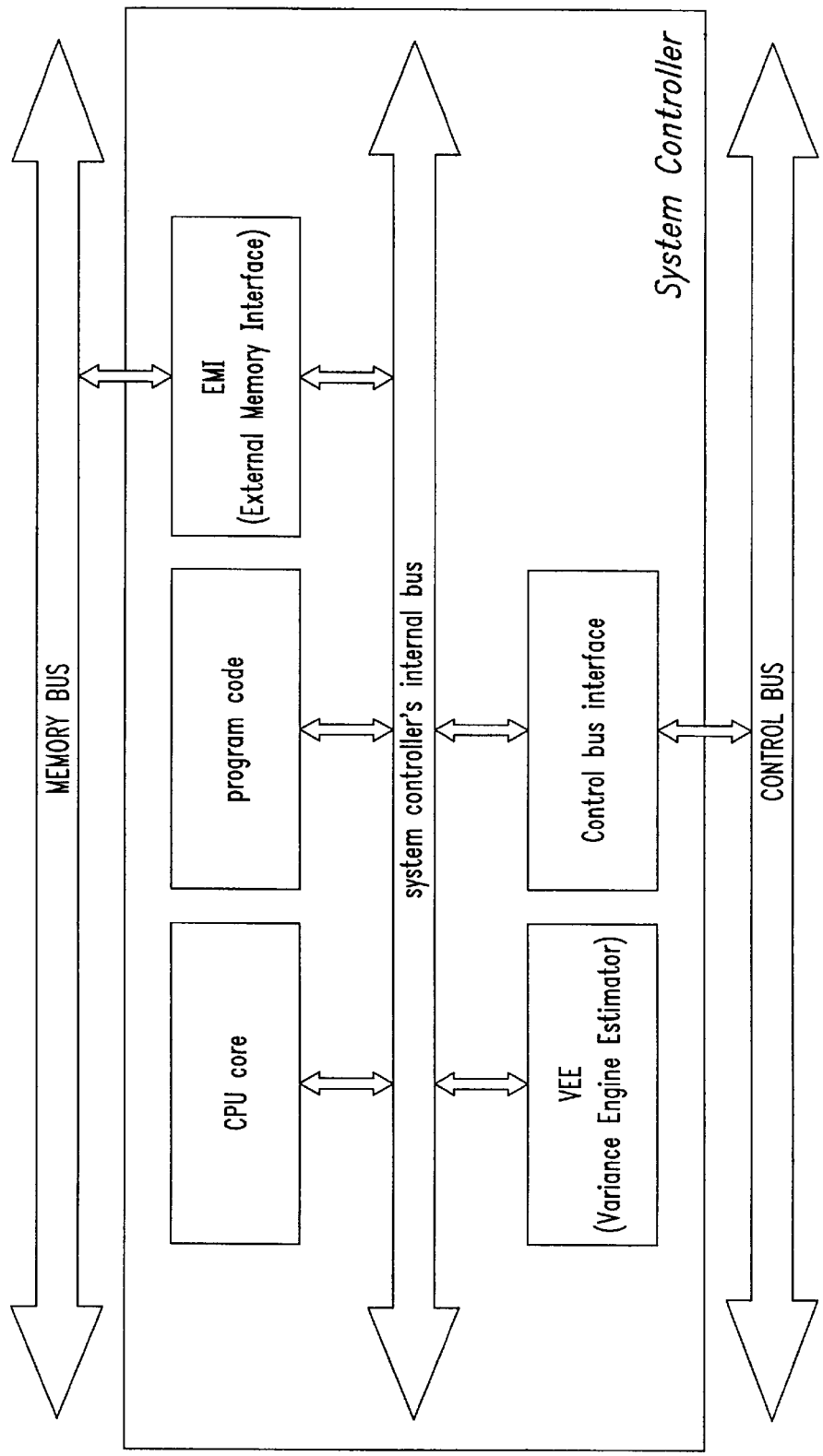
FIG. 3 shows the diagram of a system controller comprising a hardware variance estimator to alleviate the workload of the system's CPU, according to the prior art.
Figure 4:
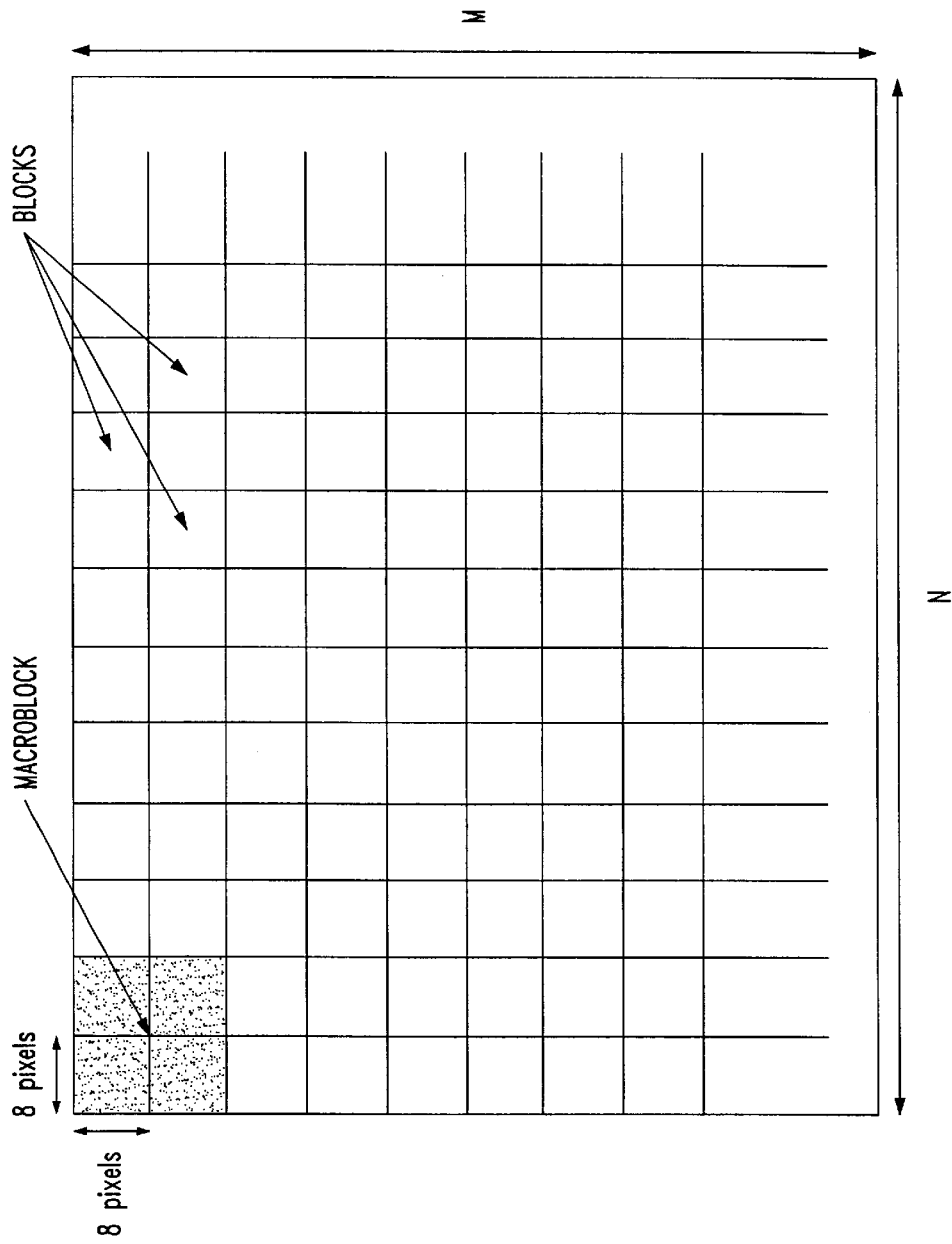
FIG. 4 shows the division of a frame in a plurality of macroblocks of pixels, according to the prior art.
Figure 6:
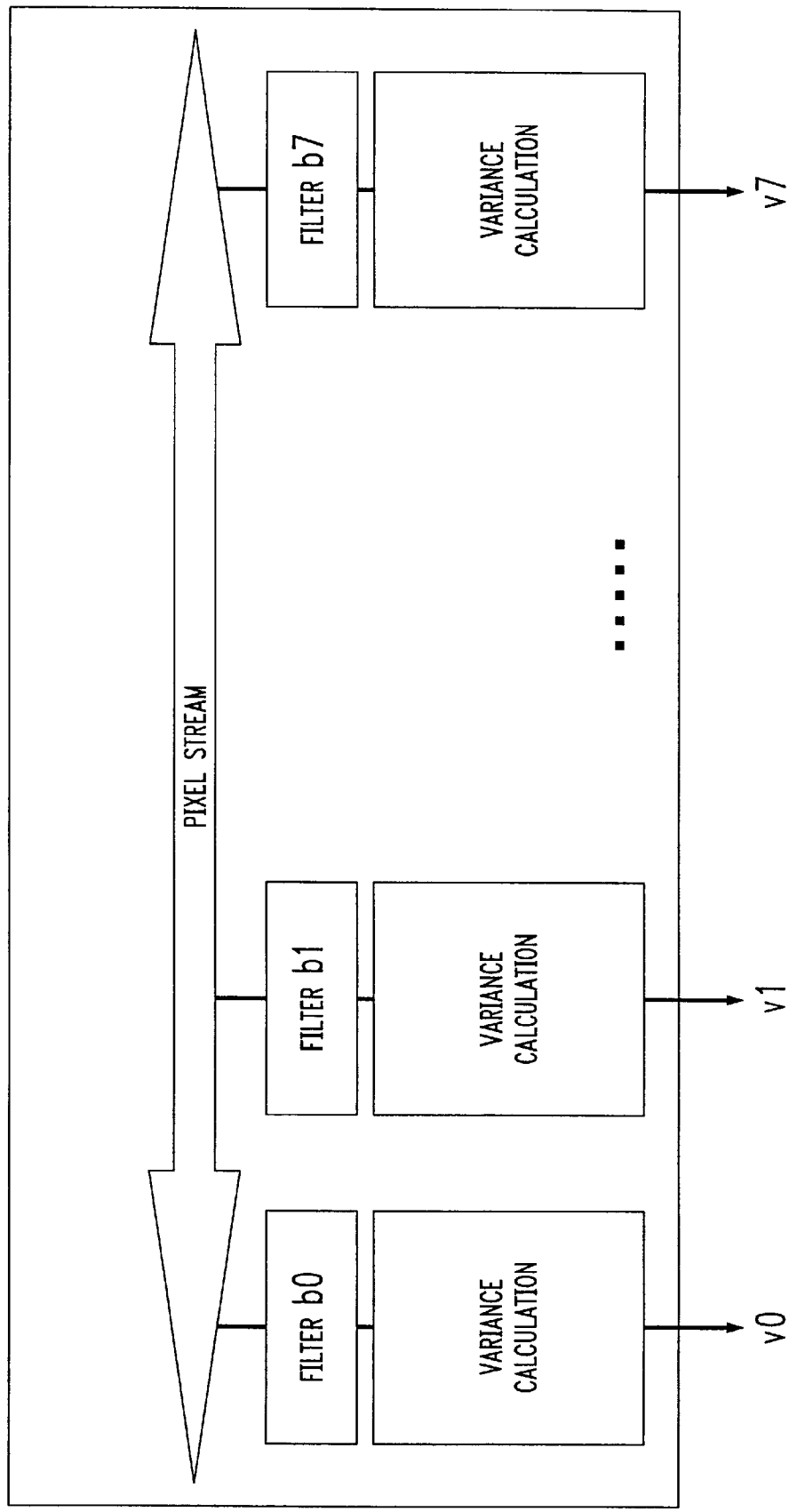
FIG. 6 is a basic diagram of a variance estimator according to the prior art.
Figure 7A:
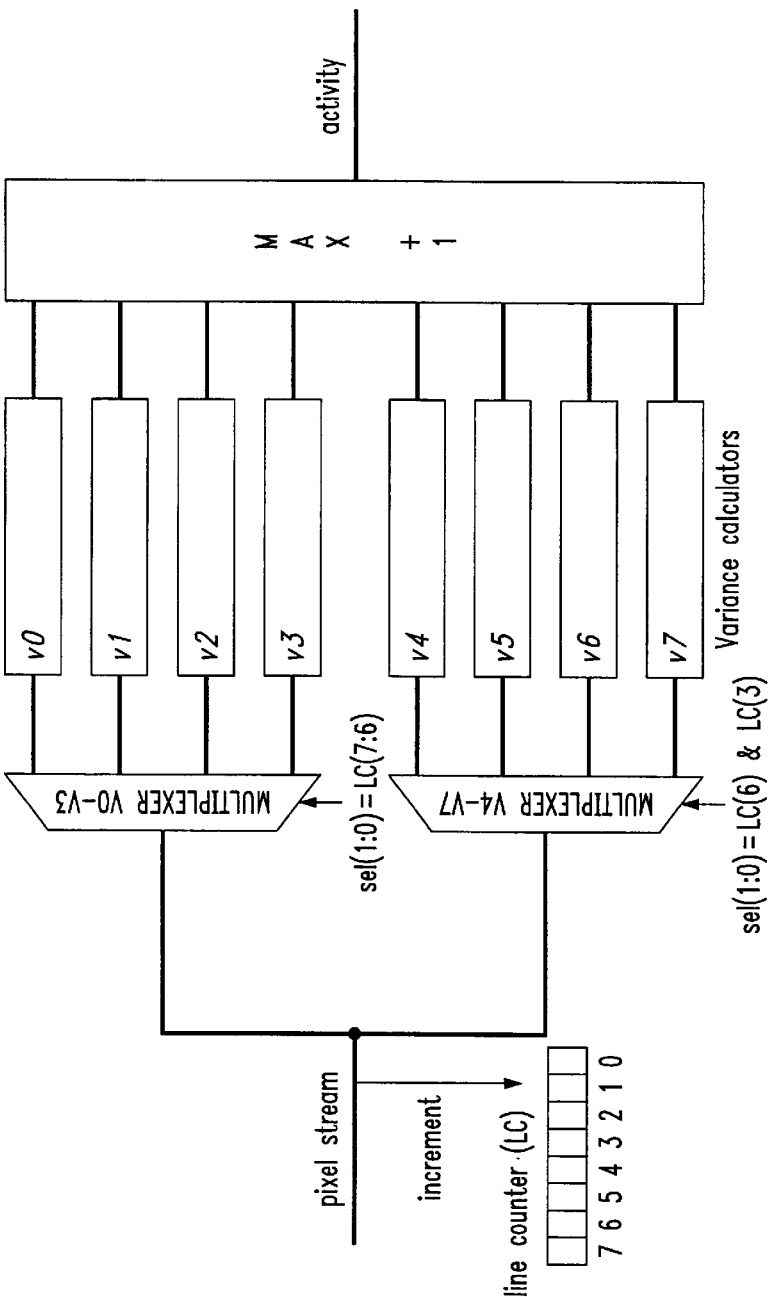
FIG. 7a is a high level block diagram of the variance estimator, according to the present invention.

With reference to the diagram of FIG. 7a, the algorithm implemented by the hardware accelerator for estimating a variance according to the invention includes conveying the input lines (rows) to the eight distinct variance processing paths. By using two demultiplexers and a simple counter (LC) connected to the end of the processing paths, it is possible to recognize which variance a certain input line of pixels belongs. Thus, it is not necessary to replicate the prior art architecture as illustrated in FIG. 6, which used up to eight filter/demultiplexer blocks.

In fact, each line belongs to only two of the blocks or subsets of pixels identified in FIG. 5. One only from the group of blocks {b0, b1, b2, b3}, and one only from the group of blocks {b4, b5, b6, b7}. The value of certain specific bits of the counter LC are used as controllers for the two demultiplexers. This permits redirection in real time of the input lines of pixels, according to the two variances to which they pertain, without having to reread the input data several times and without duplicating the select logic of the input lines of the pixels for all eight variances.

Moreover, it should be noted that according to the sample implementation for a scan path of the lines of the macroblock according to the scheme depicted in FIG. 5, the control bits are the bits 7 and 6 for the demultiplexer v0–v3 and the bits 6 and 3 are the control bits for the demultiplexer v4–v7. However, depending on how the input lines of the macroblock are scanned, different bit patterns of the counter LC may be defined for properly commanding the multiplexers. All are appropriate because the fundamental condition that each single line belongs to only one of the blocks from b0 to b3 and to only one of the blocks from b4 to b7 is fulfilled.

The general rule is that given a certain pattern of lines across which the macroblock is scanned, the bits of the counter LC that drive the multiplexers may be accordingly chosen to exactly calculate the various variances. The counter LC is reset at the start of each macroblock and incremented by the arrival of each pixel. In this way, each line is read only once, without the need to store it within the variance estimator system. There is no need of duplicating for eight times the selection logic circuitry, thus achieving a markedly reduced engagement of the available memory bandwidth, as well as a much simpler and compact structure.

Without the architecture of this invention, it would be necessary to integrate eight distinct filters, each for selecting its own lines, as illustrated in FIG. 6. The variance calculator itself, as depicted in the diagram of FIG. 8, performs a reprocessing of the formula of the variance to minimize the registers and the combined logic circuitry required for its implementation.

In particular, the splitting of the various components of the summation permits storing in parallel the sums for performing afterward to the last addition and division operations. This is done upon arrival of the last pixel of the macroblock without the need of repetitive reading phases. In this way, the two summations are calculated in parallel in the blocks 2 and 3 of the diagram of FIG. 8 instantaneously upon the arrival of the pixels. Once all the pixels have arrived, it is possible to feed the results of the distinct summations to the upstream blocks without the need to reread some of the pixels. Without this feature, the value of m should be calculated beforehand, and thereafter, reread from memory all the data to calculate the variance. In the alternative, it would be necessary to store the pixels in dedicated internal registers.

Figure 7B:
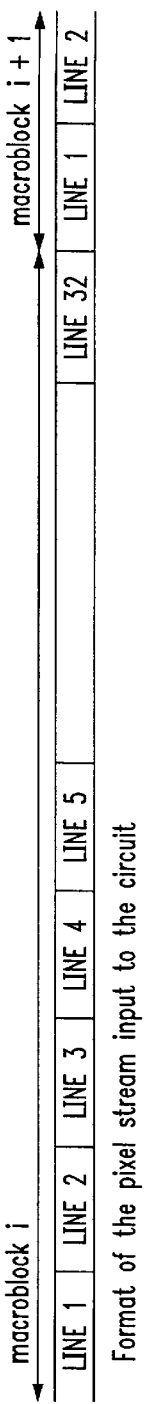
FIG. 7b is an illustration of the format of the input bitstream, according to the present invention.
Figure 8:
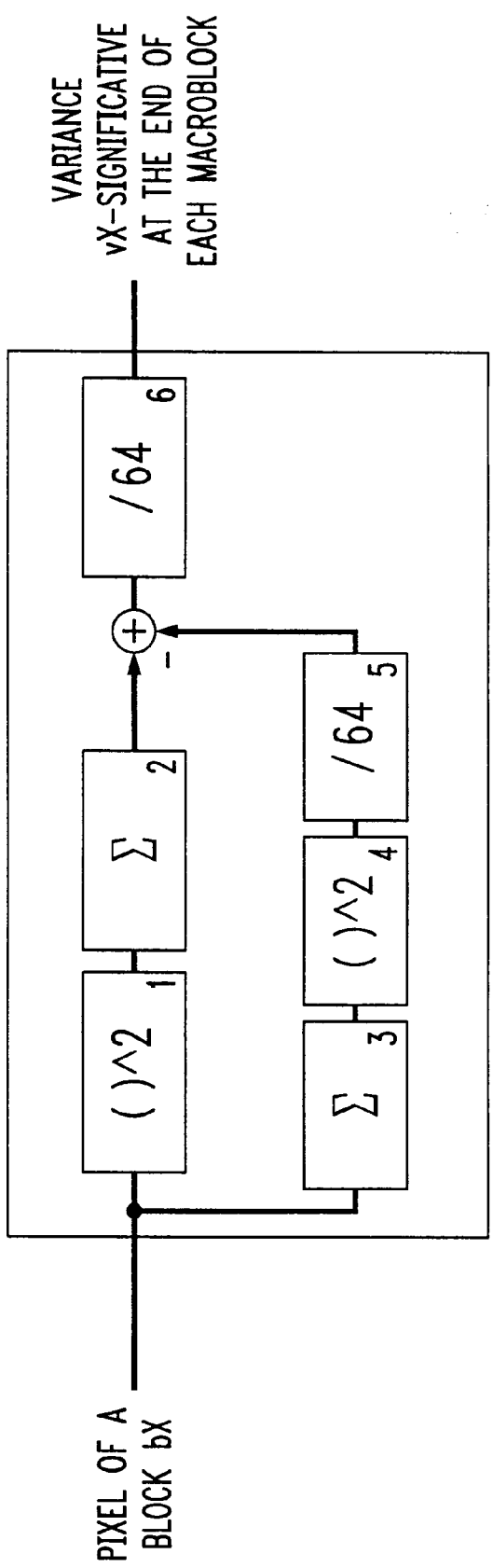
FIG. 8 shows the sum and store function implemented in the variance estimator, according to the present invention.
Figure 9:
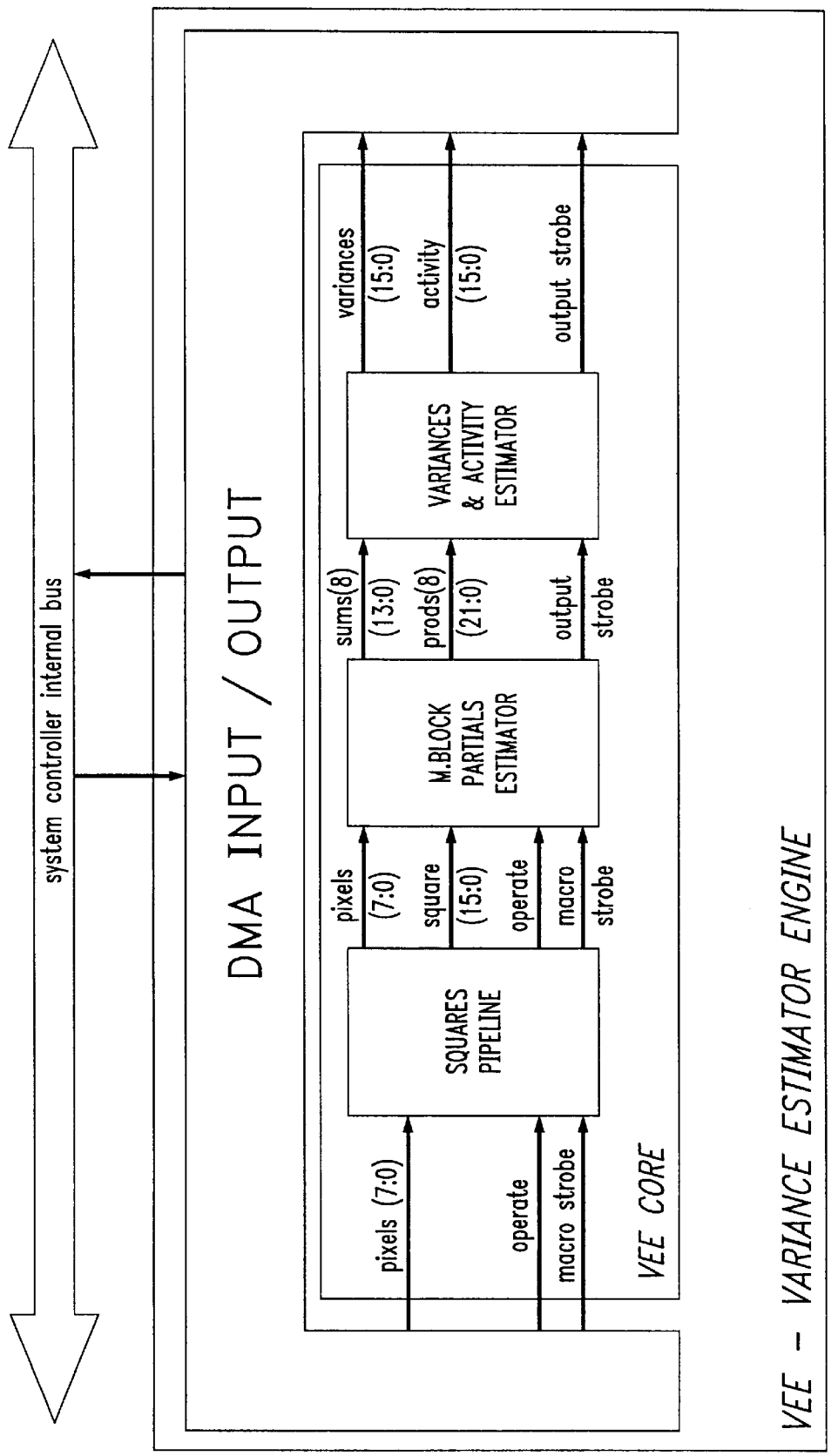
FIG. 9 is a further diagram of the architect re of the variance estimator, according to the present invention.

The accelerator of the invention is a Variance Estimator Engine (VEE), which comprises the functional blocks depicted in FIG. 9. The core of the variance estimator interacts with the external world through a normal Direct Memory Access (DMA) engine for the input of the pixels, and for writing in a memory the results of the processing carried out (the calculated variance values and activity). The DMA reads from the central memory of the encoder system, macroblock by macroblock, a picture and inputs it to the core of the variance estimator, according to an alignment as the one shown in FIG. 7b. Starting from line 1 at the top left corner, all the lines of the macroblock are scanned down to line 32 before restarting again with line 1 of the next macroblock. As far as the architecture of the core is concerned, a first block, squares pipeline, calculates the square of each pixel for use later for the calculation of the variance. This is performed in the block 1 of the diagram of FIG. 8.

The downstream block, macroblock partials estimator, determines instead the summations of the values that are output by the blocks 2 and 3 of FIG. 8. The macroblock partials estimator also determines the demultiplexing of the various pixels to the relative variance they pertain to, according to the scheme depicted in FIG. 7a. In such a block, all the registers containing the stored sums of all the eight variances are integrated. The third block, variance and activity estimator, calculates the square of the value output by the block 4, the algebraic summations, and the final divisions for obtaining the variance values, and the activity from the partial results.

In more detail, the first block calculates a square every cycle by exploiting a pipeline of eight summations. In fact, a square value may be seen as a product by the same number and a multiplication is just a series of additions. In an 8-bit binary case, this process is reduced to the summation of eight addendums. The addendum N (N=0, 1, ..., 7) will correspond to the pixel value shifted by N if the Nth position bit of the pixel itself (in consideration of the fact that we are multiplying the pixel by itself) is equal to 1, or by 0 in all other cases (the process being similar to the one followed when carrying out mutiplications "in column" by hand).

Figure 10:
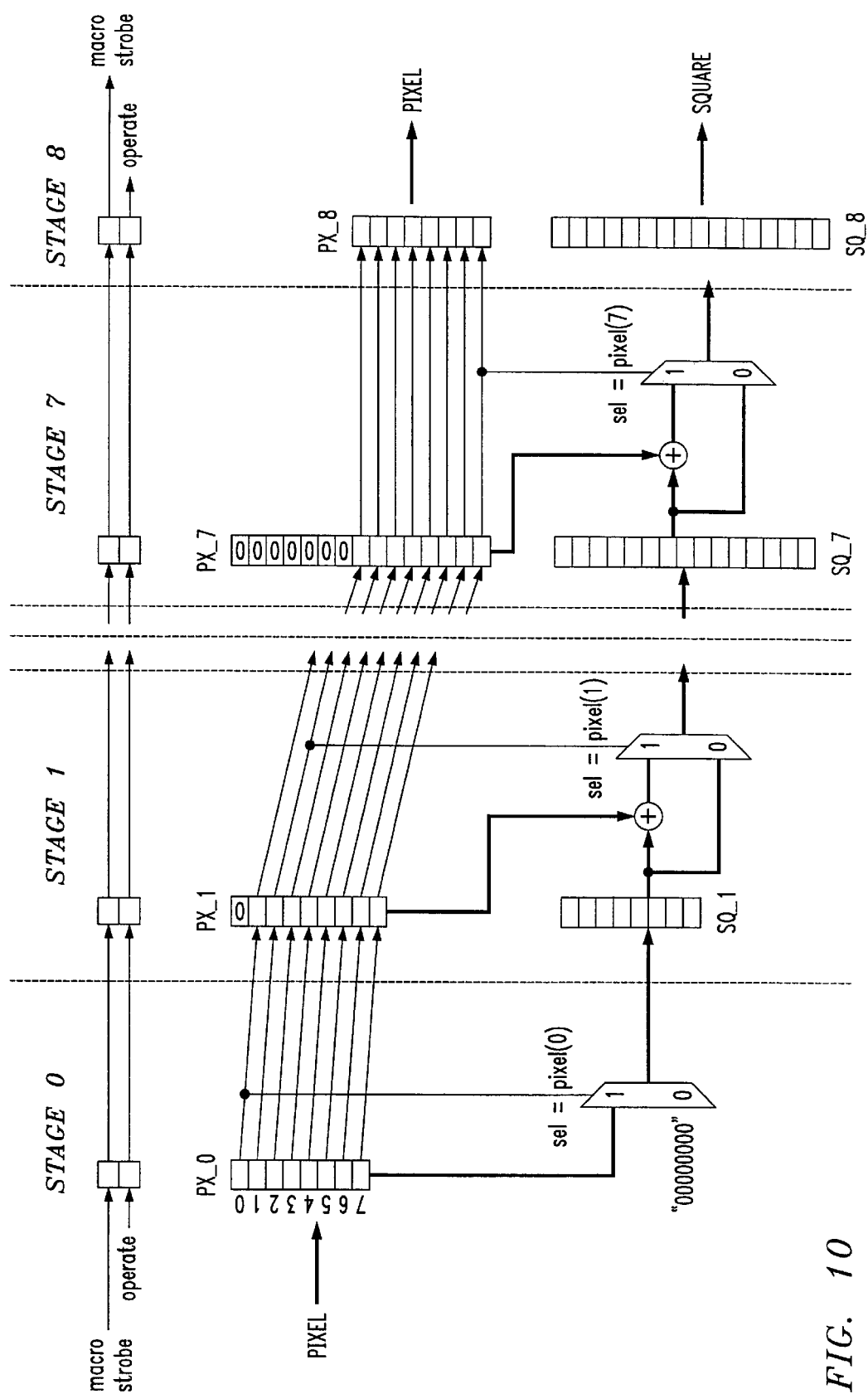
FIG. 10 shows the cascade of adders used by the hardware accelerator of variance estimation, according to the present invention.

Each stage of the pipeline depicted in FIG. 10 propagates through the registers in cascade the value of the pixel, the value of the macro_strobe and operate signals (used by downstream blocks), and the partial result of the calculation of the square of the pixel. The stage N (N=0, ..., 7) will deal with the addendum N of the above noted addition. If the relative bit of the pixel is set, the partial of the square will be incremented by the value of the pixel shifted by N bits to the left. Such a value is contained in the register PX_N. On the contrary, it will be propagated unchanged.

This implementation permits minimization of the area while ensuring the required performance, which is the ability to generate a square value every cycle. By exploiting the continuity of the data stream, the pipeline structure minimizes the average time needed for calculating a square (on the average, it provides a square value each cycle), thus avoiding implementation of a bulky look-up table.

Figure 11:
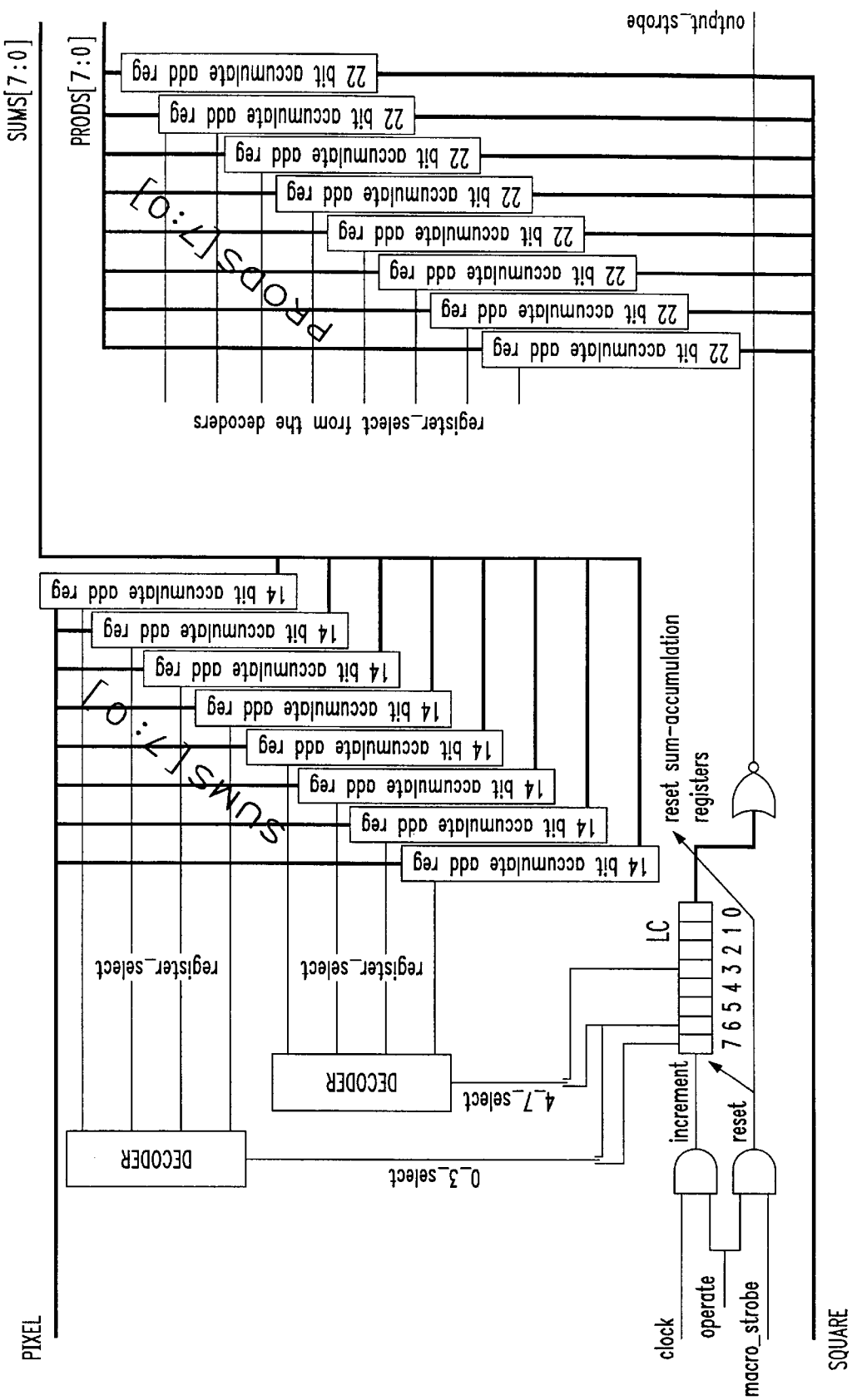
FIG. 11 is a diagram of the block performing the demultiplexing of the pixel/pixel$^2$ pairs of the two pertinent variances by adding and storing the data for all the eight variances, according to the present invention.

The squares pipeline block has a throughput of a pair pixel-square per each clock pulse. The pair of values of a pixel and of its square are fed, together with the operate and macro_strobe signals, to the second processing block. The diagram of which is depicted in FIG. 11. The second processing block demultiplexes each pair of pixel/square in the two variances to which it pertains and carries out the summations of these pixels and of their squares for all the eight variance values to be calculated, upon the streaming of the data of a whole macroblock.

The bits of the counter LC (reset at the beginning of each macroblock and incremented at the incoming of each pixel) are used for selecting the two decoders that convey the distinct lines of pixels to the addition-storing registers that contain the partial values of all the eight variances (v0 v1, v2, v3, v4, v5, v6, v7). The addition and storing registers effect the addition and the storing of the input data only if so enabled by the decoder command.

There are two banks of registers. One bank for the addition-storing of the pixels, and a second bank for the addition-storing of the squares of the pixels. Each bank consists of eight registers, one for each variance value to be calculated. The macro_strobe signal is used for recognizing the beginning of each new macroblock and resets the counter LC and the two banks of registers. The operate signal is used for stalling the registers and the counter if the input datum to the block is not valid. For example, the DMA has not been able to timely access the memory for reading the pixel.

At the incoming of the pixels, the two summations are calculated in sequence in the blocks 2 and 3 of FIG. 8. These summations will be completed for all the eight variance values at the end of each macroblock. When this occurs, the counter will have assumed the value 255 and this will raise the output_strobe signal. Each incoming pixel at the input of this block is conveyed to the selected one of the partials v0, v1, v2, v3 (by way of the bits 7 and 6 of the counter LC) and to the selected one of the partials v4, v5, v6, v7 (by way of the bits 6 and 3 of the counter LC).

Figure 12:
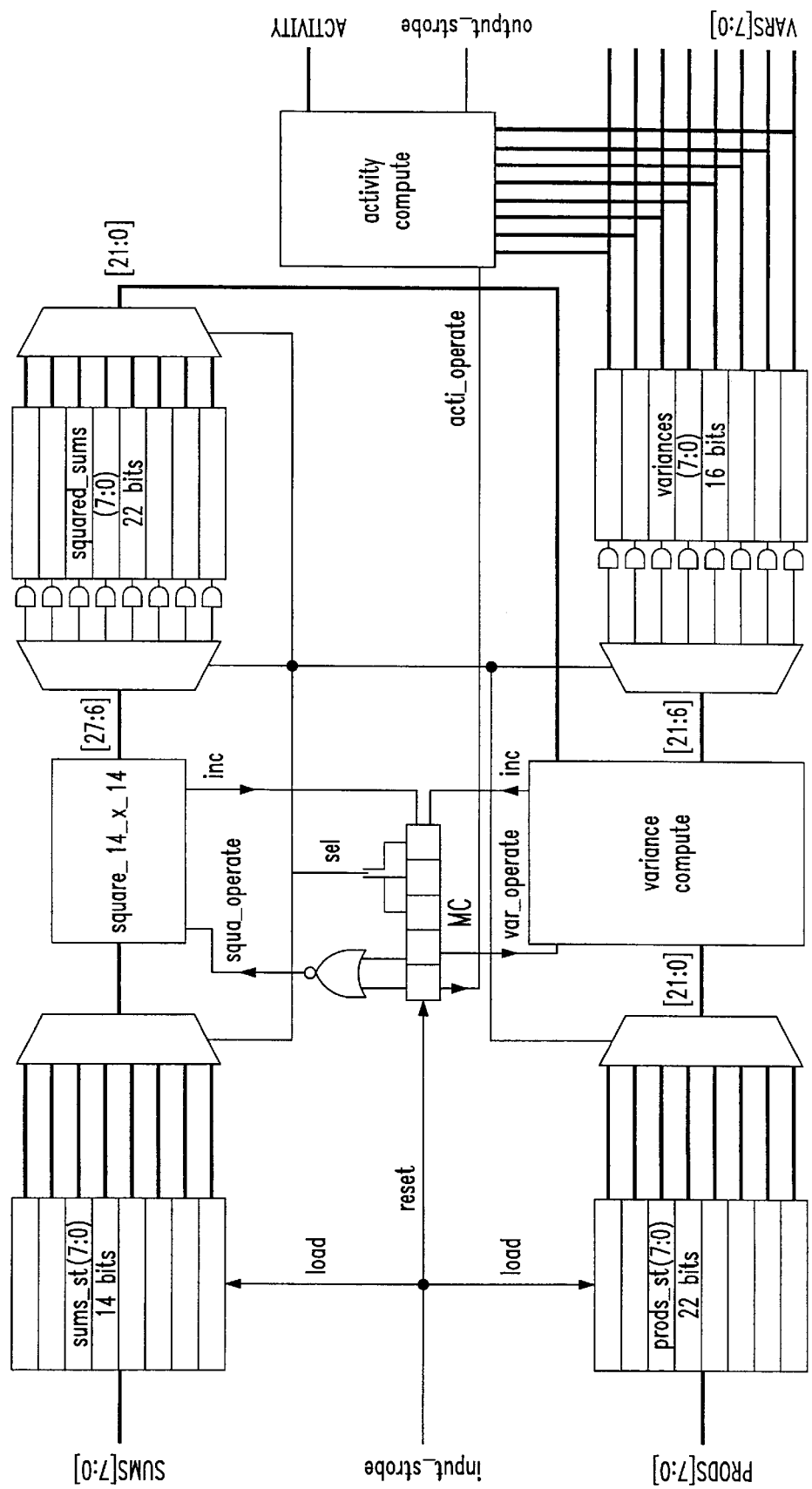
FIG. 12 shows the functional diagram that follows in cascade the diagram of FIG. 11 to produce the activity value, according to the present invention.

For the two selected partials, a cycle of addition-storage will occur. That is, the final value of the register will correspond to the initial value plus the new input pixel. The content of the deselected partials will remain unchanged. At the end of each macroblock, all the 16 sums thus obtained (pixels and squares of the pixels for each partial) are fed to the downstream block called variance and activity estimator, whose diagram is depicted in FIG. 12. The operation of this block is controlled by the counter MC. This counter is reset by the input_strobe signal and incremented by the controlled subblocks.

When the output_strobe signal is active, the partial sums of the pixels and of the squares thereof are saved in the sum_st and prod_st registers, to be processed later. During the first eight values of the counter MC, the square_14_×_14 block is active and calculates, in sequence, the eight squares of the sums of the pixels and saving the results in the squared_sum registers. This implements the functional block 4 of the diagram of FIG. 8.

The division operated by the block 5 is implemented by shedding the six least significant bits of the result. Once the calculation of these eight squares is terminated, the counter MC enables for eight cycles the block variance compute. During this phase, starting from the sums of the squares in the prods_st registers and from the squares of the sums in the squared_sum registers, the eight variances are calculated sequentially by way of subtraction. This realizes the node of algebraic sum of the functional diagram of FIG. 8.

The division operated by the block 6 is also implemented by shedding the six least significant bits. The eight variances thus produced are saved in the registers variances. Thereafter, the counter MC enables the activity compute block, which during the next eight cycles reads the eight variances and calculates the activity as the maximum value of variance plus 1.

That which is claimed is:

1. A hardware accelerator for estimating a variance of a coding system for a picture including an array of lines and columns of pixels, the hardware accelerator comprising:

a variance estimator having an input for receiving a digital stream of pixels, each pixel coded with a predetermined number of bits, said variance estimator comprising a plurality of variance calculating modules each outputting variance values of an integer number M, equal or greater than one, and each pertaining to pixels belonging to M distinct subsets of P lines and Q columns of pixels, extracted from one of H by K pixel macroblocks into which a picture is divided, where P and Q are submultiples of H and K, respectively, and M is equal or greater than Z=(P/H)*(Q/K), said variance calculating module further comprising a first multiplier having an input in which the pixels are applied in succession, and an output for providing values corresponding to the square of each respective pixel;

at least M accumulators of H*K summations of pixels, each accumulator corresponding to a H*K macroblock, a variance of which is calculated, at least M accumulators of H*K summations of squares of each pixel output by said first multiplier, each accumulator being dedicated to a H*K macroblock, the variance of which is calculated, at least one counter incremented at an incoming of each pixel of a macroblock and reset upon receiving a last pixel of the macroblock, at least M/Z demultiplexers providing a stream of pixels and squares of pixels to said at least M accumulators of H*K summations of pixels and of said at least M accumulators of H*K summations of squares, depending on a content of said at least one counter as a function of the macroblock to which a pair pixel/square of the pixel belongs, two banks of M registers being loaded as directed by said at least one counter at an end of each macroblock, storing accumulated results of said at least M accumulators of H*K summations of pixels and of said at least M accumulators of H*K summations of squares (Sq) output by said first multiplier, two banks of M input multiplexers operatively connected to respective outputs of said two banks of M registers, a second multiplier coupled to an output of said two banks of M input multiplexer connected to said two banks of M registers calculating a square (Qs) of each of the M summations of H*K pixels stored in each Mth cell of a first bank of registers, a demultiplexer for results present in said two banks of M registers, each containing a square (Qs) of one of the summations of pixels, a second block serially calculating by a formula $V=(Sq)-(Qs/64))/64$ said M variances, starting from a relative data stored in said two banks of M registers containing summations of the squares (Sq) and in said two banks of M registers containing squares (Qs) of the summations, a third bank of M registers controlled by a one-input demultiplexer having M outputs, conveying in said third bank of M registers each Mth variance, and a third block for calculation of an activity parameter determining a minimum and/or maximum value among said M variances and summing said minimum and/or maximum to 1.

2. The hardware accelerator of claim 1, wherein said first multiplier comprises a cascade of adders summing each pixel with a modified version of the same pixel; and wherein a number of zeroes are inserted in positions relative to least significant bits and incrementing by the number of said zeroes the number of bits coding said modified version of the pixel, and outputting a value equivalent to a square of the input pixel.

3. The hardware accelerator of claim 1, wherein said second multiplier comprises a circuit performing a series of additions.

4. A hardware accelerator for estimating a variance of a coding system according to MPEG-2 for a picture including an array of lines and columns of pixels, the hardware accelerator comprising:

a variance estimator having an input for receiving a digital stream of pixels, each pixel coded with a predetermined number of bits, said variance estimator comprising a plurality of variance calculating modules each outputting variance values of an integer number M, equal or greater than one, and each pertaining to pixels belonging to M distinct subsets of P lines and Q columns of pixels, extracted from one of H by K pixel macroblocks into which a picture is divided, where P and Q are submultiples of H and K, respectively, and M is equal or greater than $Z=(P/H)*(Q/K)$, said variance calculating module further comprising a first multiplier having an input in which the pixels are applied in succession, and an output for providing values corresponding to the square of each respective pixel;

at least M accumulators of H*K summations of pixels, each accumulator corresponding to a H*K macroblock, a variance of which is calculated, at least M accumulators of H*K summations of squares of each pixel output by said first multiplier, each accumulator being dedicated to a H*K macroblock, the variance of which is calculated, at least one counter incremented at an incoming of each pixel of a macroblock and reset upon receiving a last pixel of the macroblock, at least M/Z demultiplexers providing a stream of pixels and squares of pixels to said at least M accumulators of H*K summations of pixels and of said at least M accumulators of H*K summations of squares, depending on a content of said at least one counter as a function of the macroblock to which a pair pixel/square of the pixel belongs, two banks of M registers being loaded as directed by said at least one counter at an end of each macroblock, storing accumulated results of said at least M accumulators of H*K summations of pixels and of said at least M accumulators of H*K summations of squares (Sq) output by said first multiplier, two banks of M input multiplexers operatively connected to respective outputs of said two banks of M registers, a second multiplier coupled to an output of said two banks of M input multiplexer connected to said two banks of M registers calculating a square (Qs) of each of the M summations of H*K pixels stored in each Mth cell of a first bank of registers, a demultiplexer for results present in said two banks of M registers, each containing a square (Qs) of one of the summations of pixels, a second block serially calculating by a formula $V=(Sq)-(Qs/64))/64$ said M variances, starting from a relative data stored in said two banks of M registers containing summations of the squares (Sq) and in said two banks of M registers containing squares (Qs) of the summations, a third bank of M registers controlled by a one-input demultiplexer having M outputs, conveying in said third bank of M registers each Mth variance, and a third block for calculation of an activity parameter determining a minimum and/or maximum value among said M variances and summing said minimum and/or maximum to 1.

5. The hardware accelerator of claim 4, wherein said first multiplier comprises a cascade of adders summing each pixel with a modified version of the same pixel; and wherein a number of zeroes are inserted in positions relative to least significant bits and incrementing by the number of said zeroes the number of bits coding said modified version of the pixel, and outputting a value equivalent to a square of the input pixel.

6. The hardware accelerator of claim 4, wherein said second multiplier comprises a circuit performing a series of additions.

* * * * *